United States Patent
Lin

(10) Patent No.: US 7,863,879 B2
(45) Date of Patent: Jan. 4, 2011

(54) AC SIGNAL PRODUCER AND METHOD THEREOF

(75) Inventor: Yi-Chen Lin, Pingtung (TW)

(73) Assignee: Holtek Semiconductor Inc., Hsinchu (TW)

( * ) Notice: Subject to any disclaimer, the term of this patent is extended or adjusted under 35 U.S.C. 154(b) by 401 days.

(21) Appl. No.: 12/007,604

(22) Filed: Jan. 14, 2008

(65) Prior Publication Data

US 2008/0298107 A1    Dec. 4, 2008

(30) Foreign Application Priority Data

Jun. 4, 2007    (TW) .............................. 96120006 A

(51) Int. Cl.
*H03F 3/217* (2006.01)
*G05F 1/44* (2006.01)

(52) U.S. Cl. ................... 323/283; 330/207 A; 330/251

(58) Field of Classification Search ................ 315/224, 315/209 R; 323/224, 283; 330/207 A, 351
See application file for complete search history.

(56) References Cited

U.S. PATENT DOCUMENTS

| | | | |
|---|---|---|---|
| 4,972,440 A | 11/1990 | Ernst et al. | |
| 6,181,199 B1 | 1/2001 | Camp, Jr. et al. | |
| 6,449,465 B1 | 9/2002 | Gailus et al. | |
| 6,590,940 B1 * | 7/2003 | Camp et al. | .................. 375/297 |
| 6,766,271 B2 | 7/2004 | Griffin et al. | |
| 6,768,271 B2 * | 7/2004 | Busse et al. | ............. 315/209 R |
| 7,576,604 B2 * | 8/2009 | Xu | ............................... 330/10 |

OTHER PUBLICATIONS

Communication from Taiwan Patent Office dated Jun. 23, 2010 in reference to a counterpart foreign application.

* cited by examiner

*Primary Examiner*—Gary L Laxton
(74) *Attorney, Agent, or Firm*—Rosenberg, Klein & Lee

(57) ABSTRACT

An AC signal producer comprises a controlling unit, a Class-D switch circuit, and a low-pass filter. The control unit receives a DC signal and produces a PWM control signal via checking reference tables. The Class-D switch circuit receives the PWM control signal and outputs a square-wave signal. The low-pass filter converts the square-wave signal into the AC signal. Thereby, disadvantages associated with the utilization of an oscillator and a transformer to convert the DC signal to an AC signal could be solved.

15 Claims, 6 Drawing Sheets

AC SIGNAL PRODUCER AND METHOD THEREOF

BACKGROUND OF THE INVENTION

1. Field of the Invention

The present invention relates to an alternating current (AC) signal producer, and in particular to an AC signal producer utilizing a Class-D technique for converting a direct current (DC) signal to an AC signal and a method thereof.

2. Description of Related Art

A power converter in a power supply for converting a power source is classified into different types, such as AC to AC, AC to DC, DC to AC, and DC to DC. In general, the power converter for a general consumer electronic product or an electronic car product may convert an AC input from a power source to a DC voltage signal so that the general consumer electronic product or the electronic car product could be powered. If the electronic product is driven by an AC voltage signal, the power supply needs to further convert the DC voltage signal into the AC voltage signal.

Many AC power supplies use a transformer to step up or step down the voltage signal. One of the advantages of this method is that the noise is separated from the input end of the AC power supplies. Another advantage is the elimination of the noise of the output end that influences the power source at the input end. Moreover, the power provided by the transformer is more than the active component.

Please refer to FIG. 1, which shows a schematic diagram of the conventional power source converting the DC signal to the AC signal. When a DC system 10 converts the DC signal to the AC signal for an AC system 13, the DC system 10 uses an oscillator circuit 11 to output AC signal. Next, a transformer 12 converts the AC signal to a voltage level required by the AC system 13. Therefore, the DC system 10 requires the transformer 12 and the oscillator circuit 11 to output the AC signal of the required voltage level for the AC system 13.

However, a structure using a transformer for converting the DC signal to the AC signal has some disadvantages, described in the below:

1. The efficiency of power conversion is at about 50 to 60%.
2. The inductance of the transformer changes depending on the changes in the temperature, which may affect the oscillating frequency of the oscillator or even cause the oscillator not to oscillate.
3. The transformer is expensive, driving up the cost of the structure.
4. The value of the inductance of the transformer can't be controlled accurately. Therefore, the quality of the transformer is unstable.
5. The size of the transformer is large.

SUMMARY OF THE INVENTION

It is an object of the present invention to improve the structure for converting the DC signal to the AC signal. The present invention uses the Class-D technique for converting the DC signal to the AC signal. The Class-D technique is mostly used for amplifiers. An amplifier having the Class-D technique is highly efficient in terms of the conversion of signals. Because the Class-D technique is digitally controlled, the output waveform is not distorted by changes in the environmental temperature.

To achieve the above object, the present invention provides an AC signal producer comprising a control unit, a Class-D switch circuit, and a low-pass filter. The control unit has an AC waveform table. A DC signal is converted to an AC waveform according to the AC waveform table, and the AC waveform is further converted to a PWM control signal. The Class-D switch circuit receives the DC signal and the PWM control signal before outputting output a square-wave signal. The low-pass filter then converts the square-wave signal to an AC signal.

To achieve the above object, the present invention provides a method for operating an AC signal producer comprising the steps of receiving a DC signal; converting a DC signal to an AC waveform according to an AC waveform table, generating a PWM control signal according to the AC waveform, generating a square-wave signal via the PWM control signal, which is configured to control a Class-D switch circuit, and converting a square-wave signal to an AC signal.

BRIEF DESCRIPTION OF THE DRAWINGS

The present invention can be fully understood from the following detailed description and preferred embodiments with reference to the accompanying drawings, in which.

DETAILED DESCRIPTION OF THE PREFERRED EMBODIMENTS

The following detailed description is of the best presently contemplated modes of applying the invention. This description is not intended to be taken in a limiting sense, but is made merely for the purpose of illustrating general principles of embodiments of the invention. The scope of the invention is best defined by the appended claims.

Figure 1:
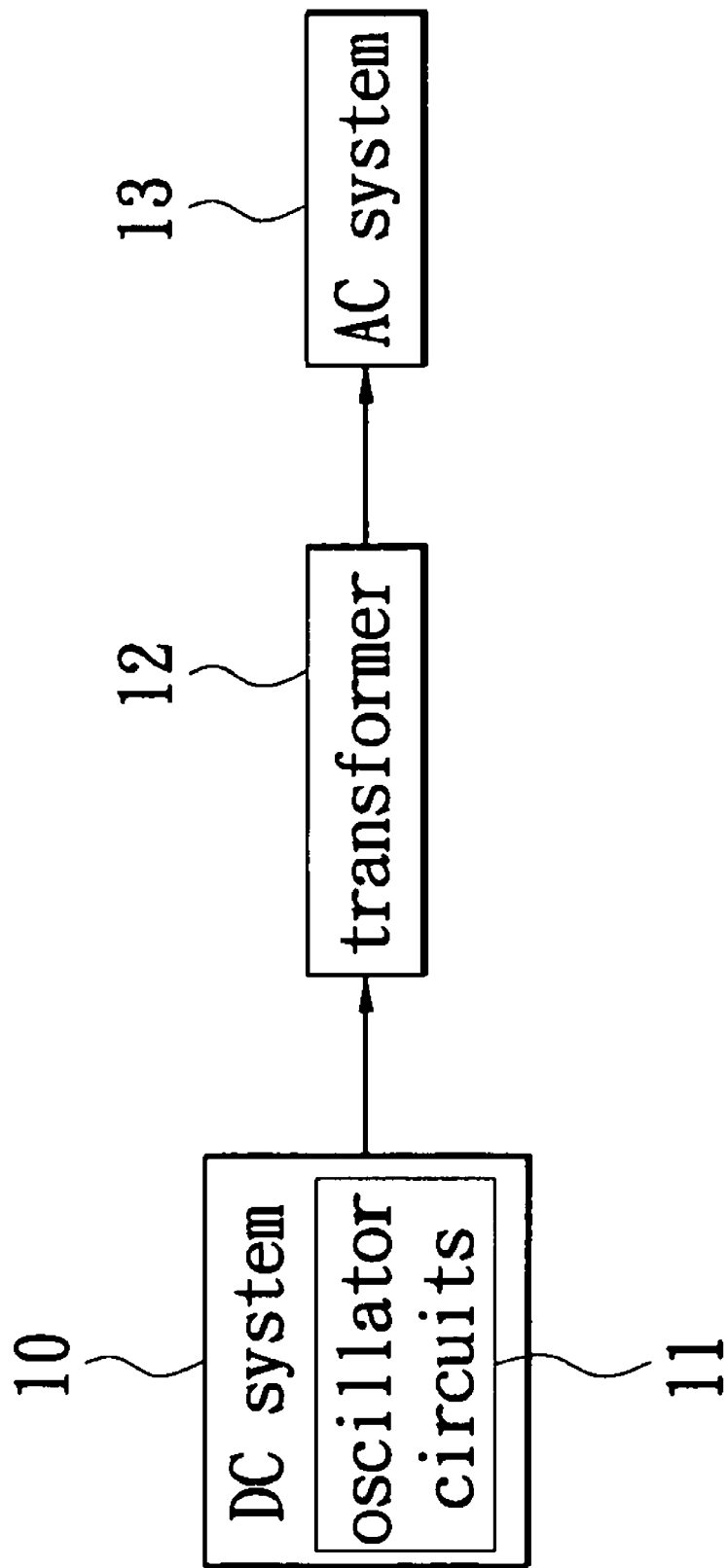
FIG. 1 is a schematic diagram of the conventional power source converting the AC signal to the DC signal.
Figure 2:
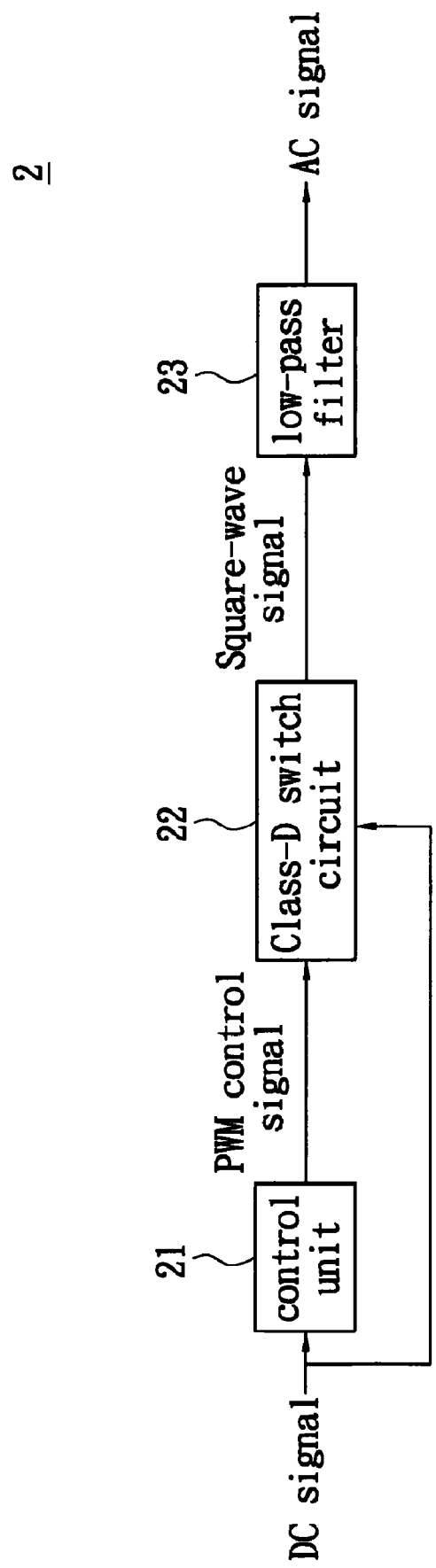
FIG. 2 is a function block diagram of the AC signal producer according to the present invention.

Please refer to FIG. 2, which shows a function block diagram of an AC signal producer of the present invention. The AC signal producer 2 comprises a control unit 21, a Class-D switch circuit 22, and a low-pass filter 23. The control unit 21 receives a DC signal. The DC signal is converted to a pulse-width modulation (PWM) control signal via a parameter table of the control unit 21. The Class-D switch circuit 22 receives the PWM control signal and the DC signal, and outputs a square-wave signal. The low-pass filter 23 converts the square-wave signal to an AC signal. The AC signal is delivered to the general consumer electronic device or electronic car device requiring the AC signal.

Figure 3:
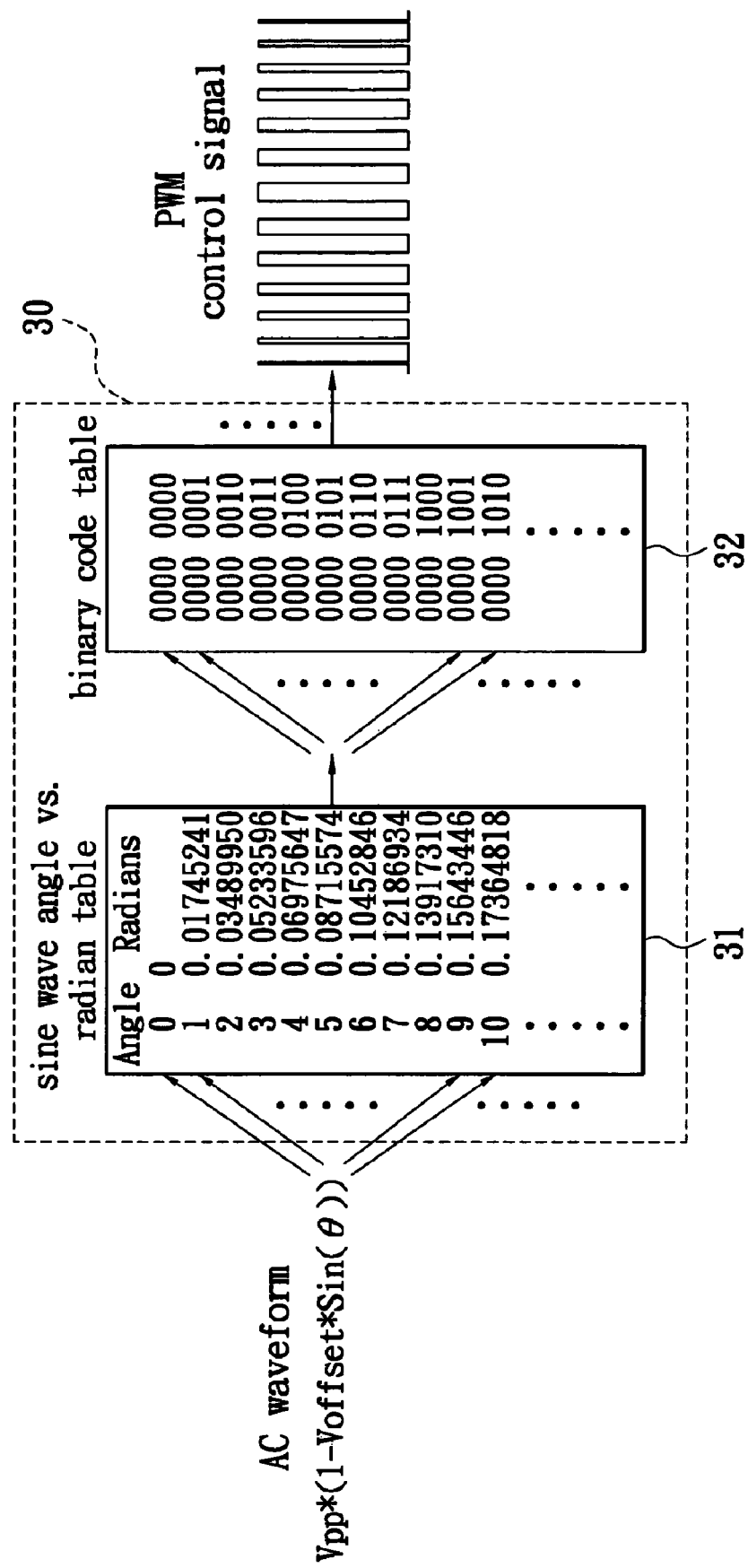
FIG. 3 is a function block diagram of the control unit according to the present invention.

Please refer to FIG. 3, which shows a function block diagram of the control unit 21 of the present invention. An AC waveform table 30 is stored in the control unit 21. The AC waveform table 30 includes a sine wave angle vs. a radian table 31 and a binary code table 32. The control unit 21 converts the DC signal to an AC waveform according to a voltage parameter and the angle and radian of the sine wave angle vs. the radian table 31. Next, the control unit 21 converts the angle and radian of the AC waveform from the binary code table 32 to output the PWM control signal. In a second embodiment, the binary code table 32 can be any digital signal conversion table with different binary codes, and the number of bits of the binary codes is not limited. The function of the binary code table 32 is for converting the angle and radian of the AC waveform to the digital-based PWM control signal.

Figure 4:
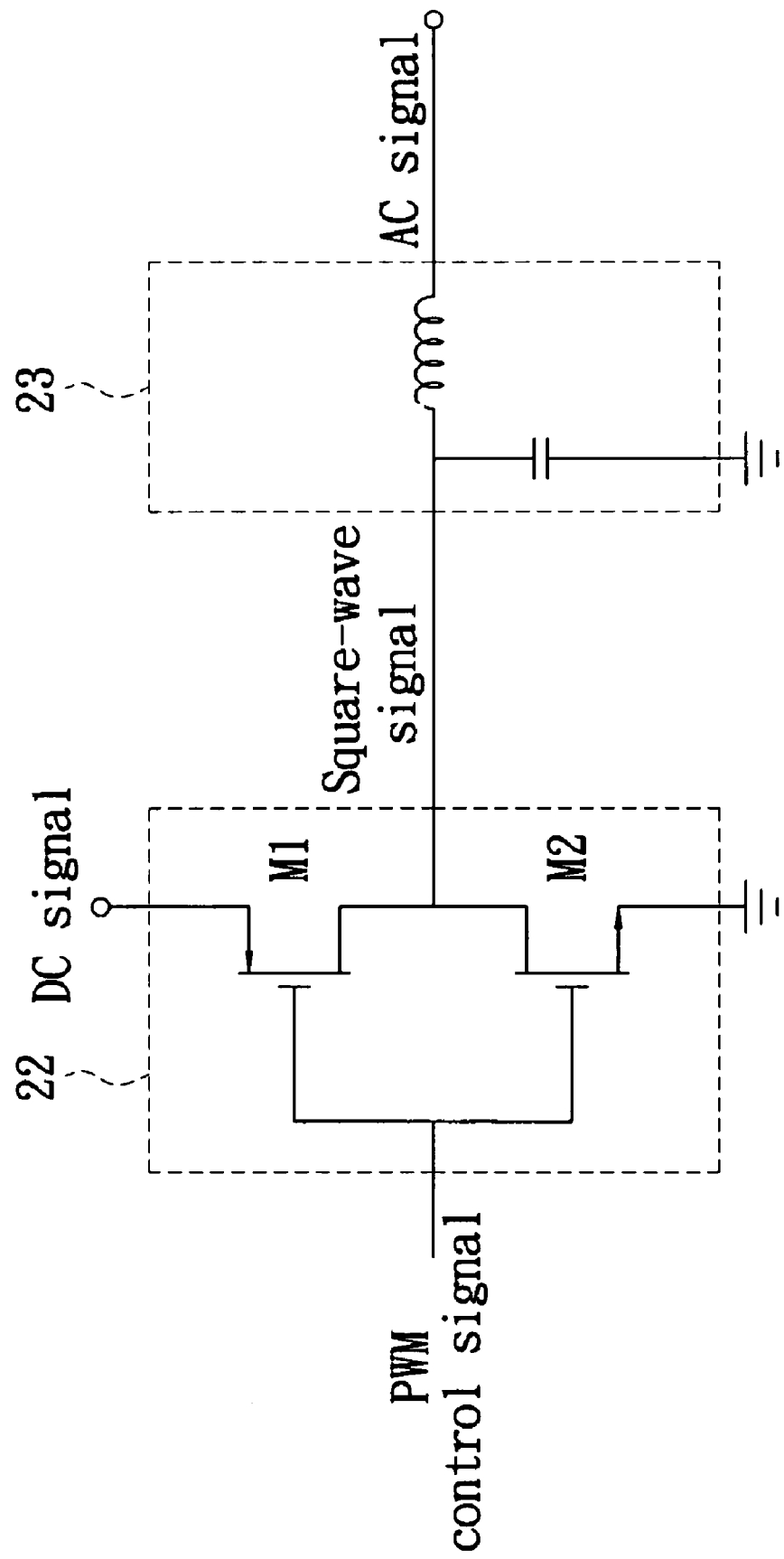
FIG. 4 is a schematic diagram of a Class-D switch circuit and a low-pass filter according to the present invention.

Please refer to FIG. 4, which shows a Class-D switch circuit 22 and a low-pass filter 23 of the present invention. The Class-D switch circuit 22 includes a p-channel metal-oxide semiconductor field-effect transistor (PMOS) switch M1 and a n-channel metal-oxide semiconductor field-effect transistor (NMOS) switch M2. A source end of the PMOS switch M1 receives the DC signal. A gate end of the PMOS switch M1 receives the PWM control signal, and thus the PMOS switch M1 could be turned on or off according to the PWM control signal. A drain end of the PWOS switch M1 outputs the square-wave signal. A source end of the NMOS switch M2 is connected to a ground. A gate end of the NMOS switch M2 receives the PWM control signal, and thus the NMOS switch M2 could be turned on or off according to the PWM control signal. A drain end of the NWOS switch M2 is connected to the drain end of the PMOS switch M2 and outputs the square-wave signal. The square-wave signal outputted from the Class-D switch circuit 22 is a disperse-dense square wave. After the square-wave signal is filtered by the low-pass filter 23, the low-pass filter 23 outputs the AC signal, which corresponds to the AC waveform.

Figure 5:
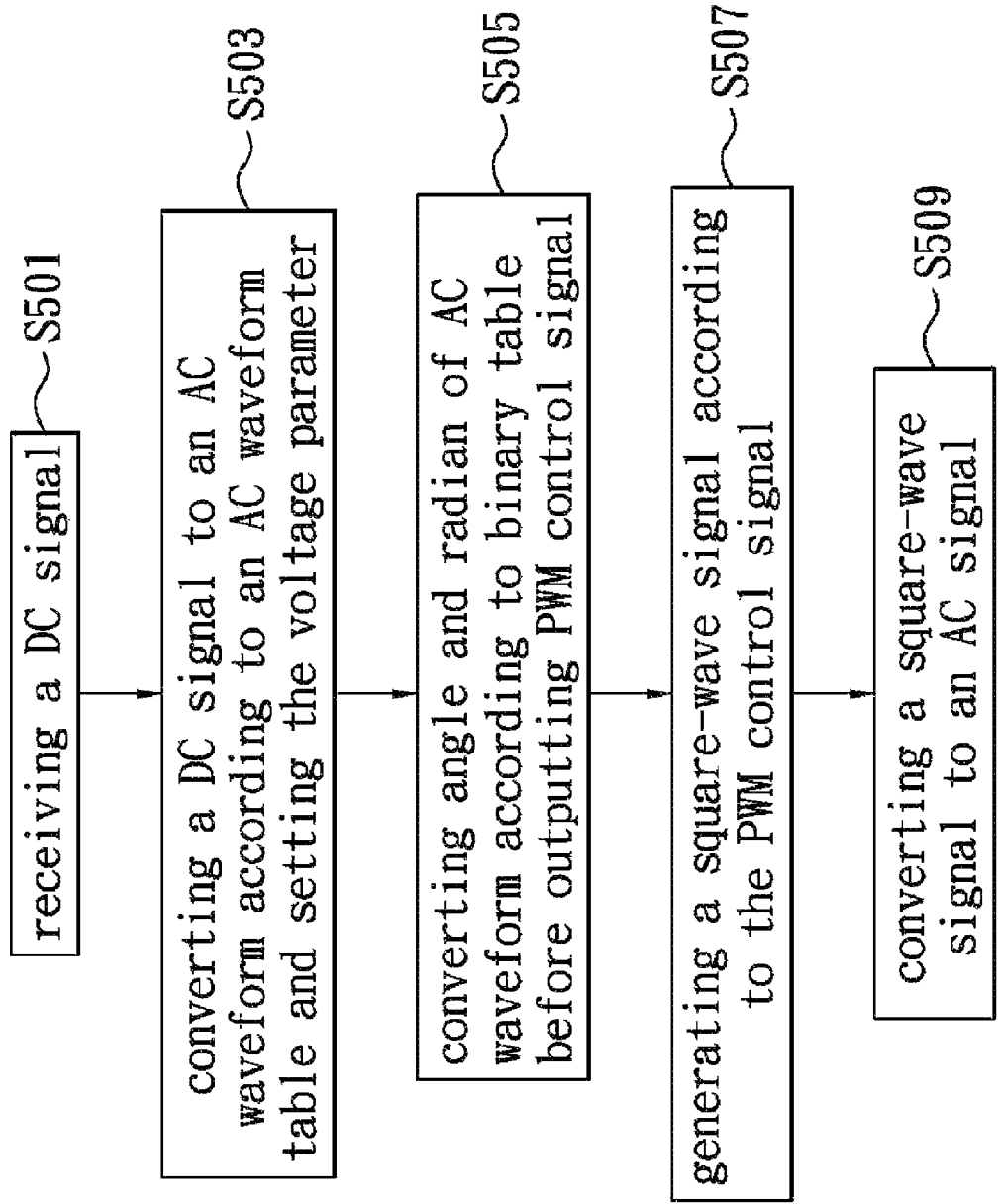
FIG. 5 is a flow chart illustrating a method for operating the AC signal producer according to the present invention.

Please refer to FIG. 5, which shows a flow chart illustrating a method for operating the AC signal producer according to the present invention. First, the control unit 21 receives a DC signal (S501). Next, the control unit 21 converts the DC signal to an AC waveform according to a voltage parameter and the angle and radian of the sine wave angle vs. the radian table 31 (S503). Next, the control unit 21 converts the angle and radian of the AC waveform according to the binary code table 32 before outputting the PWM control signal (S505). Next, the Class-D switch circuit 22 outputs the square-wave signal according to the PWM control signal (S507). Finally, the low-pass filter 23 converts the square-wave signal to the AC signal corresponding to the AC waveform (S509).

The present invention utilizes the Class-D technique for converting the DC signal to the AC signal despite the Class-D technique is usually utilized by amplifiers. The Class-D technique is highly efficient, with the power efficiency approaching 90%.

And since the Class-D technique employs digital-based control, causing no distortion on output waveforms as the conventional transformer for converting the DC signal to the AC signal may result in. Meanwhile, since the Class-D technique may be utilized in the integrated circuit the total cost for implementing the function of converting the DC signal to the AC signal may be reduced.

Figure 6:
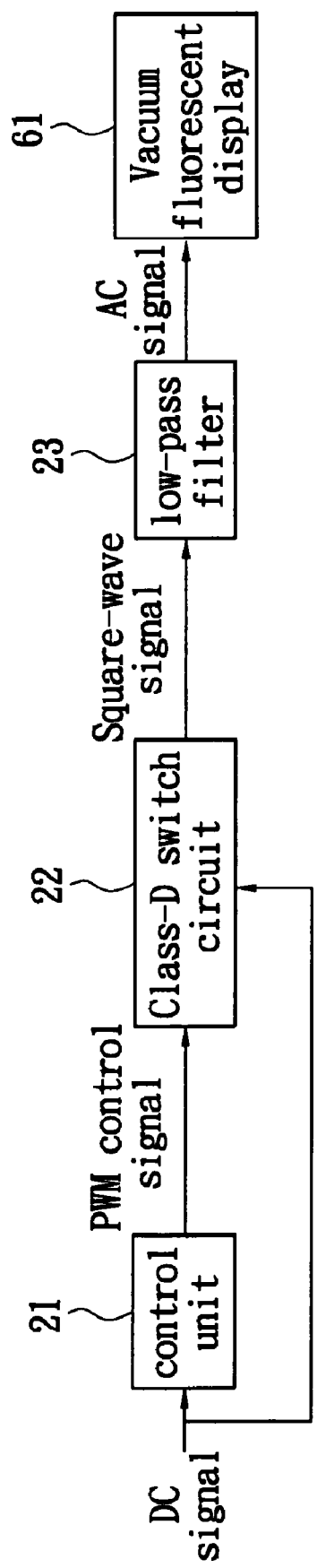
FIG. 6 is a schematic diagram of the application of the AC signal producer according to the present invention.

In general, a consumer electronic product has a power supply control unit for managing the power supply. As the AC signal producer of the present invention is readily integrated into the consumer electronic product, the size and the cost of manufacturing the consumer electronic product may reduce while the efficiency in converting the DC signal to the AC signal may increase. For example, a Vacuum fluorescent display (VFD) that is widely used in car audio plates generally requires an AC signal from the transformer and the oscillator in order to be powered. When the AC signal is provided by the transformer, the size of VFD may increase and the operation of the VFD may be affected by the temperature inside the vehicle. However, that problem may be minimized if the AC signal producer according to the present invention is utilized, as shown in FIG. 6 in which the power required for the VFD 61 is prepared by the AC signal producer 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An alternating current (AC) signal producer, comprising:
    a control unit having an AC waveform table, for converting a direct current (DC) signal to an AC waveform according to the AC waveform table, and converting the AC waveform to a pulse-width modulation (PWM) control signal;
    a Class-D switch circuit for receiving the DC signal and the PWM control signal to output a square-wave signal; and
    a low-pass filter for converting the square-wave signal to an AC signal.

2. The AC signal producer as claimed in claim 1, wherein the AC waveform table includes a sine wave angle vs. a radian table, and the DC signal being converted to the AC waveform according to the since wave angle vs. the radian table.

3. The AC signal producer as claimed in claim 2, wherein the AC waveform table includes a binary code table, and the AC waveform is converted to the PWM control signal according to the binary code table.

4. The AC signal producer as claimed in claim 1, wherein the Class-D switch circuit comprises:
    a p-channel metal-oxide-semiconductor field-effect transistor (PMOS) switch having a source end of the PMOS switch for receiving the DC signal, a gate end of the PMOS switch for receiving the PWM control signal, and a drain end of the PWOS switch for outputting the square-wave signal; and
    a n-channel metal-oxide-semiconductor field-effect transistor (NMOS) switch having a source end of the NMOS switch connected to ground, gate end of the NMOS switch for receiving the PWM control signal, and a drain end of the NWOS switch connected to the drain end of the PMOS for outputting the square-wave signal.

5. The AC signal producer as claimed in claim 1, wherein the square-wave signal is a disperse-dense square wave.

6. The AC signal producer as claimed in claim 1, wherein the AC signal producer is incorporated in an Integrated Circuit.

7. A method for operating an alternating current (AC) signal producer having a Class-D switch circuit, comprising:
    receiving a direct current (DC) signal;
    converting the DC signal to an AC waveform according to an AC waveform table;
    generating a pulse-width modulation (PWM) control signal according to the AC waveform, wherein the PWM control signal is configured to control the Class-D switch circuit;
    generating a square-wave signal via the PWM control signal controlling a Class-D switch circuit; and
    converting the square-wave signal to an AC signal.

8. The method as claimed in claim 7, further comprising: applying the AC signal to an AC power working device.

9. The method as claimed in claim 8, wherein the AC power working device is a Vacuum fluorescent display.

10. The method as claimed in claim 7, wherein the AC waveform table includes a sine wave angle vs. the radian table.

11. The method as claimed in claim 7, further comprising: setting a voltage parameter of the AC waveform for converting the DC signal to the AC waveform.

12. The method as claimed in claim 7, further comprising converting the AC waveform to the PWM control signal according to a binary code table.

13. The method as claimed in claim 7, wherein the AC signal is generated via a low-pass filter filtering the square-wave signal.

14. The method as claimed in claim 7, wherein generating the square-wave signal via the PWM control signal controlling the Class-D switch circuit further comprises: receiving the PWM control signal via a p-channel metal-oxide-semiconductor field-effect transistor (PMOS) switch and a n-channel metal-oxide-semiconductor field-effect transistor (NMOS) switch for outputting the square-wave signal.

15. The method as claimed in claim 7, wherein the square-wave signal is a disperse-dense square wave, and the square-wave signal corresponds to the AC waveform.

* * * * *